US012544107B2

(12) United States Patent
Jelic

(10) Patent No.: US 12,544,107 B2
(45) Date of Patent: Feb. 10, 2026

(54) EXTERNAL LOAD BEARING DISTRACTING DEVICE FOR AN ARTICULATING ANATOMICAL JOINT

(71) Applicant: Flexi Oscar d.o.o., Zagreb (HR)

(72) Inventor: Mislav Jelic, Zagreb (HR)

(73) Assignee: Flexi Oscar d.o.o., Zagreb (HR)

( * ) Notice: Subject to any disclaimer, the term of this patent is extended or adjusted under 35 U.S.C. 154(b) by 763 days.

(21) Appl. No.: 17/897,883

(22) Filed: Aug. 29, 2022

(65) Prior Publication Data

US 2023/0029403 A1 Jan. 26, 2023

Related U.S. Application Data

(63) Continuation-in-part of application No. 16/627,909, filed as application No. PCT/EP2018/025138 on May 14, 2018, now Pat. No. 11,478,276.

(30) Foreign Application Priority Data

Jul. 3, 2017 (GB) ..................................... 1710591

(51) Int. Cl.
*A61B 17/64* (2006.01)
*A61B 17/66* (2006.01)
*A61B 17/56* (2006.01)

(52) U.S. Cl.
CPC ...... *A61B 17/6425* (2013.01); *A61B 17/6475* (2013.01); *A61B 17/66* (2013.01); *A61B 2017/564* (2013.01)

(58) Field of Classification Search
CPC ............ A61B 17/6425; A61B 17/6466; A61B 17/6475; A61B 17/66; A61B 17/846; A61B 2017/564; A61B 2017/567

(Continued)

(56) References Cited

U.S. PATENT DOCUMENTS 4,100,919 A * 7/1978 Oganesyan ........ A61B 17/6425
606/56
4,628,919 A * 12/1986 Clyburn ............. A61B 17/6491
606/57

(Continued)

FOREIGN PATENT DOCUMENTS

DE 102006027155 A1 * 12/2007 ............. A61B 17/62
GB 2519981 A 5/2015
WO 2011049796 A2 4/2011

OTHER PUBLICATIONS

PE2E translation of DE-102006027155-A1 (Year: 2007).*
Smith Pn et al, "Development of the concepts of knee kinematics" by , Arch Phys Med Rehabil. (Dec. 2003), 84 (12): pp. 1895-1902.

*Primary Examiner* — Eduardo C Robert
*Assistant Examiner* — David C Comstock
(74) *Attorney, Agent, or Firm* — St. Onge Steward Johnston & Reens LLC; Stephen P. McNamara

(57) ABSTRACT

An external load bearing distracting device, which can be positioned to fully unload a knee joint cartilage while providing the knee joint normal motion, for an articulating anatomical joint. The device includes a first and second rotatable threaded rods arranged longitudinally on opposite sides of a rotating joint, and first and second translational tubes slidably arranged around the first and second rotatable threaded rods, respectively. The rotating joint may comprise a ball-and-ring-joint configured for accommodating a two mutually complementary brake elements. The first and second rotatable threaded rods each include a first and second clamping nuts thereon, which contact a proximal end of the first and second translational tube to limit longitudinal translation thereof towards the rotating joint. The distracting device is intended for temporary implantation to treat osteoarthritis, focal cartilage defects, and fractures inside the knee joint.

30 Claims, 10 Drawing Sheets

(58) Field of Classification Search
USPC .......................... 606/55, 57, 58, 59, 90, 105
See application file for complete search history.

(56) References Cited

U.S. PATENT DOCUMENTS

| | | | | |
|---|---|---|---|---|
| 5,803,924 | A * | 9/1998 | Oni | A61B 17/6416 |
| | | | | 606/57 |
| 6,056,748 | A * | 5/2000 | Weiner | A61B 17/6475 |
| | | | | 606/54 |
| 2003/0187432 | A1* | 10/2003 | Johnson | A61B 17/66 |
| | | | | 606/59 |
| 2004/0260302 | A1 | 12/2004 | Manspeizer | |
| 2005/0015087 | A1* | 1/2005 | Walulik | A61B 17/66 |
| | | | | 606/54 |
| 2006/0229605 | A1* | 10/2006 | Olsen | A61B 17/6475 |
| | | | | 606/54 |
| 2012/0143189 | A1 | 6/2012 | Wolfson | |
| 2016/0022315 | A1 | 1/2016 | Soffiati | |
| 2019/0336172 | A1* | 11/2019 | Wurapa | A61B 17/6425 |
| 2020/0397482 | A1* | 12/2020 | Liu | A61B 17/8605 |

* cited by examiner

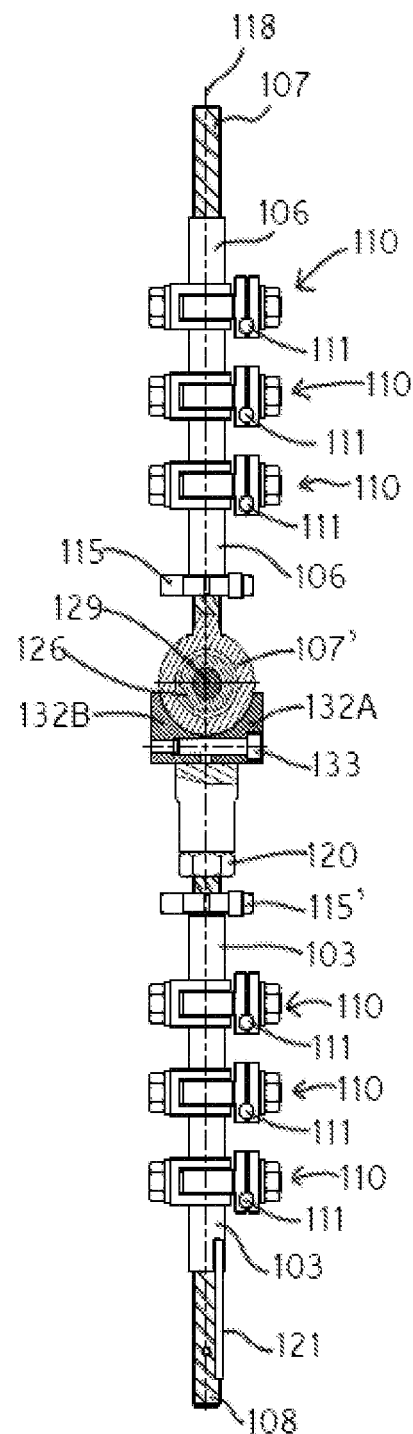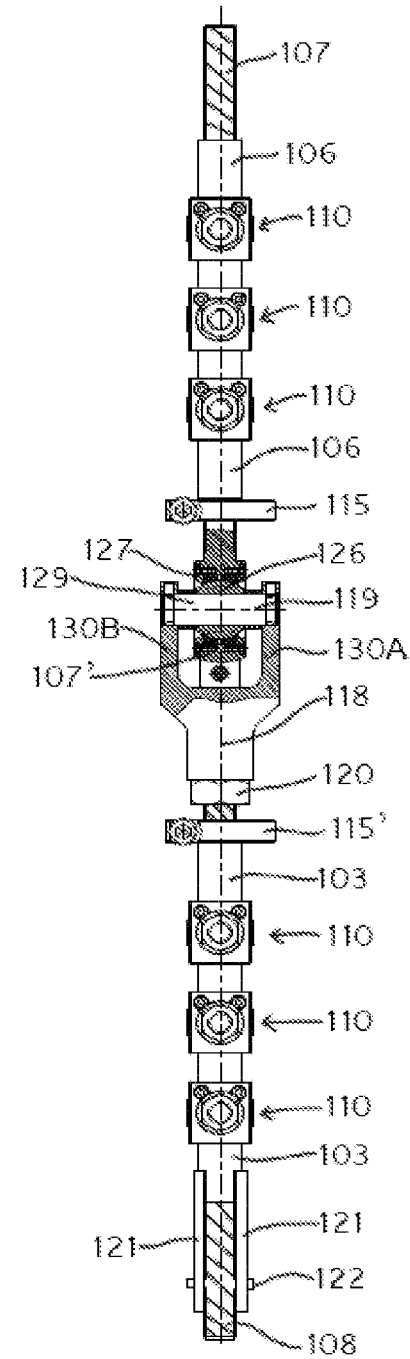
FIG. 5  FIG. 6

EXTERNAL LOAD BEARING DISTRACTING DEVICE FOR AN ARTICULATING ANATOMICAL JOINT

FIELD OF THE INVENTION

The present invention relates to an external load bearing distracting device for an articulating anatomical joint. In a preferred embodiment, the articulating anatomical joint is a knee joint. More particularly, the present invention relates to the external load bearing distracting device which can be positioned to unload a knee joint while providing its normal motion and can be adjusted to distract and fully unload the knee joint cartilage. The present invention is intended for use particularly, but not exclusively, to treat osteoarthritis (OA), focal cartilage defects and treatment of fractures occurred inside the knee joint.

BACKGROUND OF THE INVENTION

The knee joint is subject to many types of traumatic injuries and pathological conditions which result in soft tissue rupture, dislocation, bone fracture, cartilage erosion, or infection. The current methods of treatment are usually rest, bracing, casting, internal fixation, external fixation, ligamentous reconstruction, prosthetic replacement or a combination of the above.

Immobilization has been found to be less than satisfactory because it can reduce subsequent motion of the joint, sometimes permanently. Soft tissue repairs are adversely affected by both immobilization and mobilization, unless the latter is prevented from overstretching the tissues before healing occurs.

External linkages would not suffer from the above shortcomings but have been unsatisfactory in the past because they provide only approximate motion and are not compatible with the more exacting motion requirements of the internal structures of the knee joint. A device which allows physiological motions of the knee and which in parallel provides unloading of the knee joint would thus be of a great clinical benefit and would enable further advances in the knee joint treatment.

It has been known that the joint surfaces of the knee undergo a combination of rolling and sliding, that the medial and lateral sides move differently and that there is a transverse rotation of the femur about the longitudinal axis of the tibia, especially towards the extension position. This is known as the "screw-home" mechanism. Actually, the movements of the knee joint include six degrees of freedom of motion namely 3 translations (antero-posterior, medio-lateral and distraction-compression) and 3 rotations (flexion-extension, *varus*-valgus and internal-external).

The physiological motion of the human knee involves an extremely complex "polycentric" motion wherein the center of rotation of the tibia with respect to the femur varies as a function of the angle of rotation. This motion is caused by simultaneous movements of the interacting surfaces involved in articulation of the knee, including: internal-external rotation of the tibia relative to the femur about a vertical axis; movement between the femoral and tibial parts about a horizontal, anterior-posterior axis; and sliding and anterior-posterior rolling of ends of the femoral and tibial parts in an anterior-posterior plane. The physiological motion of the tibia relative to the femur is further complicated by the three-dimensional component of motion outside the sagittal plane, and by the contribution of ligaments, tendons and cartilage structure.

The above can be best understood with reference to FIGS. 1 and 2 which are a schematic representation of the knee joint as seen from the medial or lateral side, and in a perspective view. As seen there, the tibia includes upper joint load-bearing surfaces A which are slightly curved and slope downward in a posterior direction relative to the longitudinal axis of the tibia. The femur includes lateral and medial condyles whose load-bearing surface outlines B can be approximated by circular arcs. That is, the centers of curvature C of those portions of the load-bearing surface which are in contact with the tibia at various angles of flexure are not identical. As seen in FIG. 1, at small degrees of flexion the arc which is defined by the load-bearing surface has an instantaneous center of curvature C. However, at greater flexion of the knee the arc defined by the load-bearing surface has an instantaneous center of curvature C' which is different from the previously mentioned arc. Instantaneous centers of curvature C to C', through which centers an axis of rotation of the knee joint undergoes, indicates an instantaneous center of curvature only for the specified arc of motion. The path of the serial locations of the instantaneous centers of curvature during flexion-extension of the knee joint is called the evolute. All movements of the centers of rotation differ from knee to knee and from the medial to the lateral sides of a given knee. In many practical clinical situations, it is necessary to make simple estimates of the location of the axis of rotation of the knee joint. A series of radiographs is required to precisely identify the instantaneous axis of rotation at a knee joint. This method is not practical in ordinary clinical situations. However, according to recent developments in the area of knee kinematics it has been discovered that "one" axis occurs throughout the most arc of motion. The review of the development of concepts of knee kinematics is disclosed in publication "Development of the concepts of knee kinematics" by Smith P N et al, Arch Phys Med Rehabil. 84 (12): 1895-902 (December 2003), where the derivation of the flexion-extension axis by using 3-dimensional imaging technology was applied. According to said review, "one" posterior condylar axis is effective from 15° to 150° of the knee flexion. This axis passes through the origins of the medial (MCL) and lateral collateral ligaments (LCL) and passes through the intersection of the cruciate ligaments. It closely approximates the epicondylar line and is offset from the sagittal plane by 7°. Further, in said publication the description of the screw-home mechanism can be overcome by external forces during active movement. Additionally, cited authors Blankevoort et al and La Fortune et al found no evidence of screw-home mechanism in vivo. In conclusion of the said publication, the model of the knee as a ball-and-socket joint is a model in which the knee can function. Further, it is recommended to the designers of knee prosthesis not to apply a roll back design but rather to incorporate freedom or control of longitudinal rotation, which recommendation has been incorporated in the present invention, particularly freedom of longitudinal rotation.

The concept of rolling one surface on another was utilized in the structure disclosed in "Restoration of Function in the Knee and Elbow with a Hinge Distractor Apparatus" by Volkov et al The Journal Of Bone and Joint Surgery, Vol. 57-A, No. 5, July 1975, pp. 591 to 600 (July 1975). In the design there described, two transverse pins through the femur and tibia held an adjustable rack and pinion on the medial and lateral sides as well as a locking mechanism anteriorly. Traction bows encircled the anterior halves of the shank and thigh. The rack and pinion arrangement utilized the concept of rolling one surface on another. However, this design was complex and did not accurately approximate the motion of the knee. The rack and pinion resulted in backward motion of the femoral condyles on the tibial condyles during flexion. Moreover, there were no differences in motion between the medial and lateral sides of the joint.

The prior art document published under no. WO2011049796 (Apr. 28, 2011) is directed to the implantable assemblies for manipulating energy transferred by means of flexing absorbing members, wherein said means are configured to flex and absorb energy transferred by the members of the anatomical joint. Document no. US2004260302 (Dec. 23, 2004) discloses an internal brace for distraction arthroplasty, the internal brace includes femoral and tibial components which can be fixed to the patient's femur and tibia and which in combination distract or separate the knee joint without substantially hindering mobility of the knee. The invention provides an implantable brace for use in a knee joint, the implantable brace functions as a wedge in this meniscal space to distract or to open the joint where there has been unicompartment articulate cartilage narrowing, while enabling motion of the knee both in anterior and posterior rolling motions and providing for rotational and sagittal plane motion.

US20160022315 discloses an external fixing device for the treatment of bone fractures. A distraction or a compression of the bone ends is carried out during the surgery for attaching the device itself to the bone portions to be treated. After that the device is locked in position, the joints 5, 6, 105, 106, 205, 206 are locked and do not have a floating connection.

None of the prior art documents is directed to a device intended for temporary distracting an articulating anatomical joint such as the knee joint and at the same time to allow mobility of the anatomical joint.

SUMMARY OF THE INVENTION

It is an object of the present invention to provide an improved external load-bearing distracting device for the knee joint which distracts the knee joint and unloads the knee cartilage while positively enabling natural motion of the knee and bearing a required portion of the load.

Another object of the present invention is to provide an external load-bearing distracting device for the knee joint which provides a flexion-extension of the knee joint in the range at least between 0-90°, wherein natural range of motion of the knee joint is not affected, particularly freedom of longitudinal rotation.

Another object of the present invention is to provide an external load-bearing distracting device for the knee joint, which when anchored at a lateral or at a medial side of a first and second anatomical member of an articulating anatomical joint, enables movement of the knee joint during every day activities of the patient and does not rigidly place the anatomical elements in fixed positions.

Another object of the present invention is to provide an external load-bearing distracting device for the knee joint made of biocompatible materials having high specific strength and at the same time having elastic mechanical properties to additionally reduce imposed stresses on the bones during application of an external load-bearing distracting device.

Another object of present invention is to provide an external load-bearing distracting device for the knee joint which is temporally attached to the patient, preferably for a period of 6 to 8 weeks, said device is intended for use particularly, but not exclusively, in relation to treatment of osteoarthritis (OA), focal cartilage defects and treatment of fractures occurred inside the knee joint, wherein a reduction of subsequent motion of the joint, after removal the distracting device, is prevented.

Another object of present invention is to provide a method of implanting an external load bearing distracting device for an articulating anatomical joint and a method of distracting an articulating anatomical joint.

The present invention provides an external load bearing distracting device for an articulating anatomical joint. The external load bearing distracting device has a first translational tube configured to be attached to a first anatomical member of the articulating anatomical joint; a first rotatable threaded rod; a second translational tube configured to be attached to a second member of the articulating anatomical joint; a second rotatable threaded rod; a rotating joint joining the first and second rotatable threaded rods; the rotating joint being configured to enable natural motion present in the articulating anatomical joint; a first adjustment clamping nut provided on the first rotatable threaded rod; and a second adjustment clamping nut provided on the second rotatable threaded rod. The first translational tube is slidably arranged around the first rotatable threaded rod, and the second translational tube is slidably arranged around the second rotatable threaded rod. The first and second rotatable threaded rods are configured to be disposed on opposite sides of a mediolateral axis of rotation of the rotating joint. The first adjustment clamping nut is positioned between the rotating joint and a proximal end of the first translational tube such that a longitudinal displacement of the first translational tube, towards the rotating joint, relative to the first rotatable threaded rod is limited by a contact between the first adjustment clamping nut and the proximal end of first translational tube; and the second adjustment clamping nut is positioned between the rotating joint and a proximal end of the second translational tube such that a longitudinal displacement of the second translational tube, towards the rotating joint, relative to the second rotatable threaded rod is limited by a contact between the second adjustment nut and the proximal end of the second translational tube. The first and second translational tubes and the first and second threaded rods each is carried out of one solid part. The first and second threaded rods are both provided with the first and second adjustment clamping nut for adjusting and fixing the first and second translational tubes at the desired longitudinal position in relation to a flexion-extension axis of rotation of the articulating anatomical joint. By virtue of the first and second adjustment clamping nut by simultaneously turning said adjustment clamping nuts, the first and second translational tubes are shifted along respective first and second rotatable threaded rods in opposite direction away from the mediolateral axis of the rotating joint, the first and second translational tubes are each held at the desired longitudinal position providing distraction of the articulating anatomical joint.

Further, as well as described in a first embodiment of the present invention, the rotating joint is joining the first and second threaded rods, wherein the rotating joint is configured to enable six degrees of motion of the articulating anatomical joint. Replacement of the adjustment clamping nuts with a first and second pairs of nuts for adjusting and fixing the first and second translational tubes at the desired longitudinal position in relation to a flexion-extension axis of rotation of the articulating anatomical joint presents another way of carrying out the invention and does not in any way affect the functionality of the invention.

A further object of the present invention is to provide a rotating joint configured to for accommodating a two mutually complementary brake elements to temporally prevent natural range of motion of the knee joint.

A further object of the present invention is to provide a means to prevent an unwanted excess rotation of a respective first or second translational tube in relation to a respective first or second rotatable rod, or both. In this embodiment, a pair of parallelly arranged first pins and a second pin are mutually positioned to limit rotation of the respective first or second translational tube in relation to a respective first or second rotatable rod in each direction around a longitudinal axis of a device for approximately 20°, i.e., total for approximately 40°.

A further object of the present invention is to provide components of an external load bearing distracting device made from a biocompatible alloy selected from implant grade stainless steel, cobalt chrome, titanium or nitinol alloys, or ceramic material, or combinations thereof. Preferably, components of the external load bearing distracting device are made from titanium alloys.

In a preferred embodiment of the present invention the articulating anatomical joint is a knee joint, where said first translational tube is configured to be fixed to a femur of the knee joint and said second translational tube is configured to be fixed to a tibia of the knee joint.

In a preferred embodiment of the present invention the joint joining the first and second rotatable extensions comprises a structure like a ball-and-ring joint.

Depending on the position of a degenerated articular cartilage surfaces, the external load bearing distracting device can be anchored at a lateral or at a medial side of the articulating anatomical joint, or simultaneously on both sides of the articulating anatomical joint.

Various other objects, features and attendant advantages of the present invention will be more fully appreciated as the same become better understood from the following detailed description when considered in connection with the accompanying drawings in which like reference characters designate like or corresponding parts throughout the several views and wherein:

BRIEF DESCRIPTION OF THE DRAWINGS

FIG. 5 is a side view from the front side of the distracting device according to one embodiment of the present invention.

FIG. 6 is a side view from the lateral side of the distracting device according to one embodiment of the present invention.

DETAILED DESCRIPTION OF THE INVENTION

Figure 1:
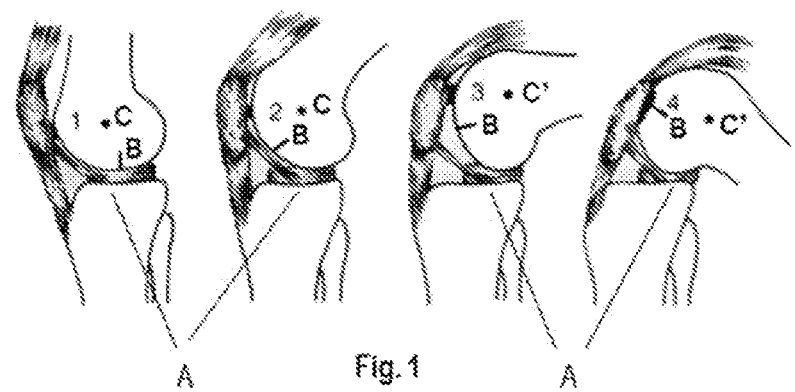
FIG. 1 is a schematic illustration, from the lateral or medial side, of a knee joint.
Figure 2:
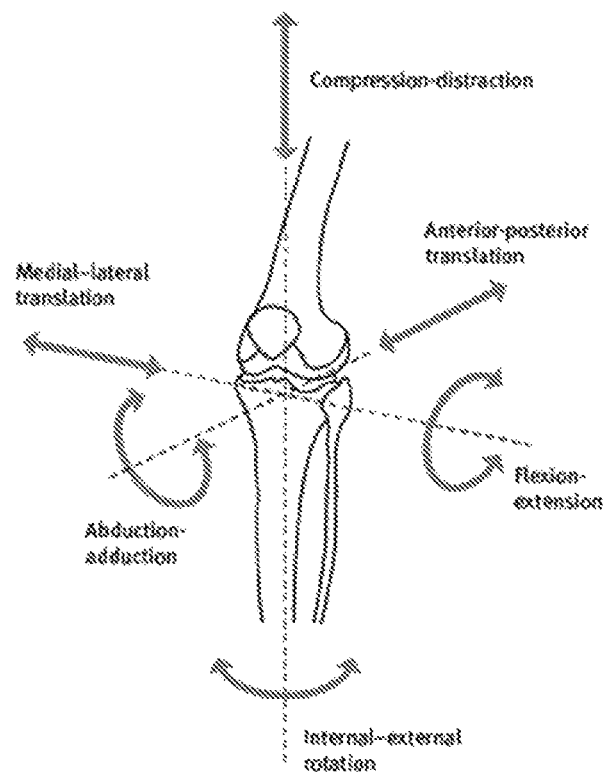
FIG. 2 is a schematic illustration of a knee joint degrees of freedom of movement.
Figure 3:
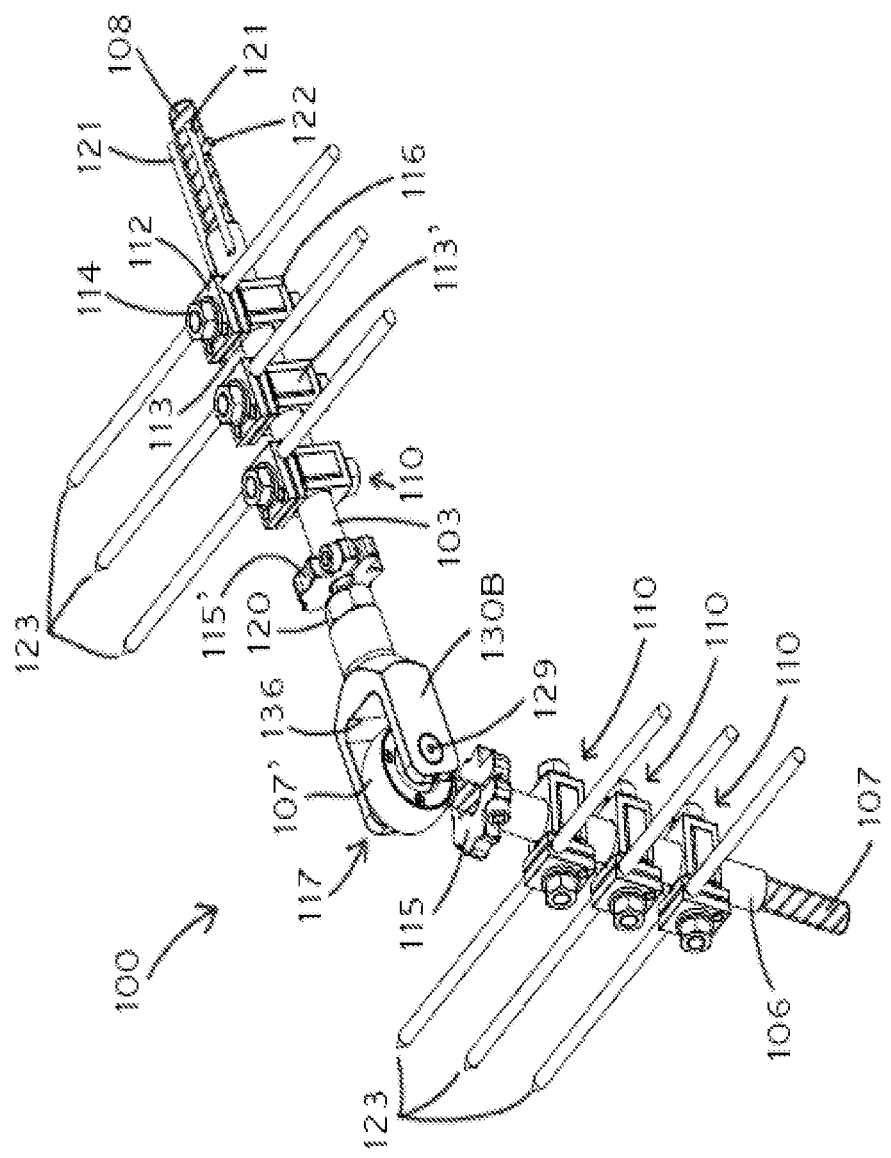
FIG. 3 is a perspective view of a distracting device according to one embodiment of the present invention.
Figure 4:
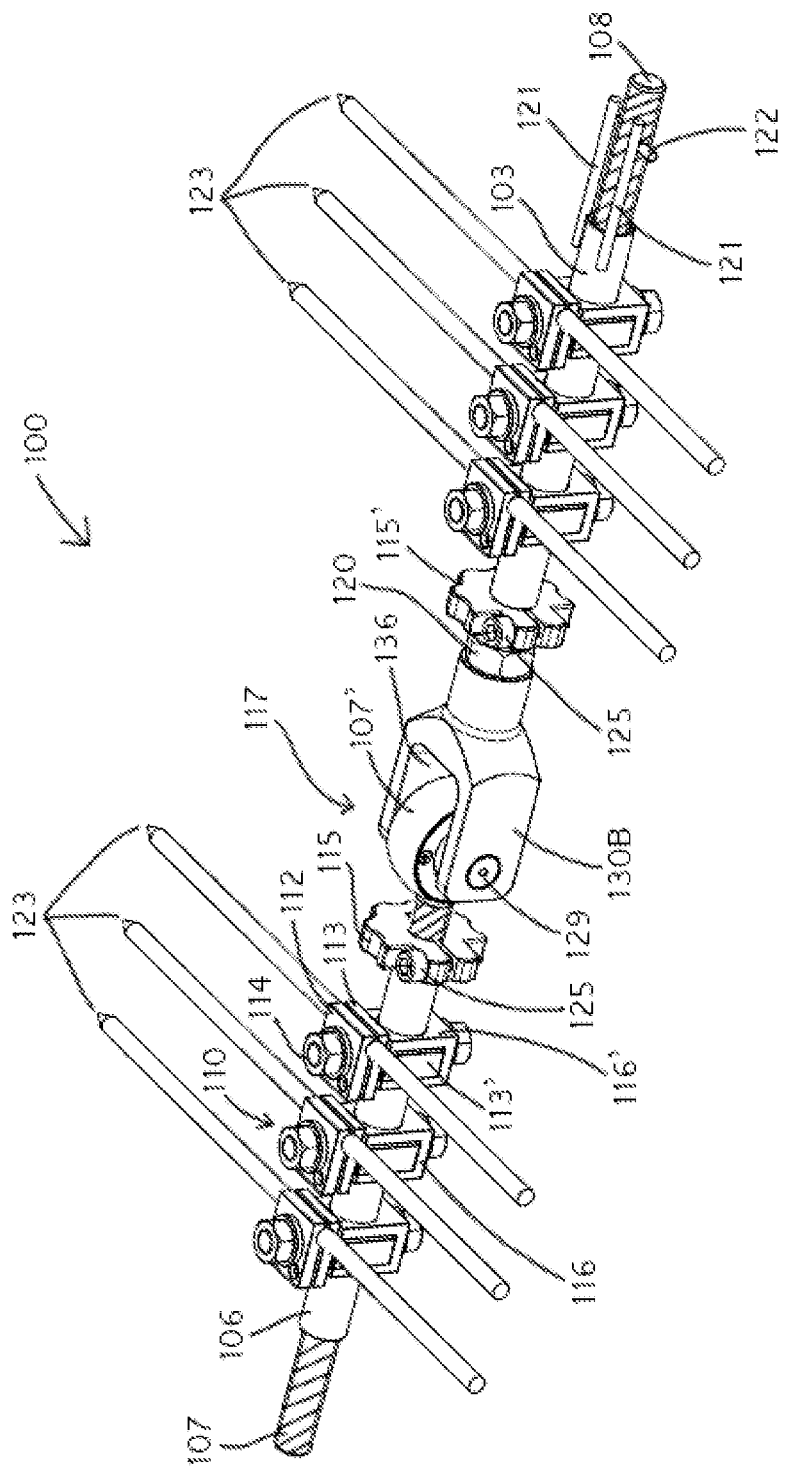
FIG. 4 is a perspective view of the distracting device of FIG. 3.

As best seen in FIG. 1, the tibia load bearing surface A is simulated as a planar surface while the femoral condylar load bearing surfaces are simulated as circular load bearing surfaces B having centrodes moving from point 1 to point 4 during the flexion of the knee. That is, it has been determined that the rolling and sliding motion of the knee joint causes the centrode to move from 1 to 4 during flexure, the distance 1-4 varying between the lateral and medial compartments. It is proposed that one posterior condylar axis is effective from 15° to 150° of knee flexion, hereafter referring to a flexion-extension axis of the knee joint. The present invention provides a device which enables natural movement of the knee joint and distracts the knee joint in a longitudinal direction (in a sagittal plane) to the distance corresponding at least to a healthy knee joint. Distracting the knee joint to a distance corresponding at least to the healthy knee joint, for a period of time determined by the medical indications, enables recovery of the cartilage defects related to various knee joint diseases or injuries. In a knee distraction surgery, femur and tibia bones are slightly pulled apart and held into place by a plurality of pins which protrude from the skin in an external fixation, where a joint of an external load bearing distracting device enables natural movement of the knee joint. The distraction device is implanted for a period of 6 to 8 weeks to allow cartilage to regenerate. With the bone-on-bone alleviated—the articular cartilage can now repair itself without the weight and mechanical stress of the "bone on bone". The knee distraction procedure can be combined with other knee treatments such as applying treatment with hyaluronic acid or stem cells treatment for cartilage tissue regeneration, or injecting signaling molecules or any other local or systemic treatment of the knee joint.

The present invention distracts the load bearing surfaces A and B by providing an external load bearing distracting device mounted to a lateral or medial sides of a tibia and a femur, possibly by transcutaneous transverse pins.

It must be noted that as used herein and in the appended claims, the singular forms "a", "an", and "the" include plural referents unless the context clearly dictates otherwise. Thus, for example, reference to "a means" or "the means" includes plurality of such means.

Reference to the term "distal" associated with components of the present invention relates to a part of the component situated away from the flexion-extension axis of rotation of the articulating anatomical joint or respectively a rotating joint according to the present invention, and reference to the term "proximal" associated with components of the present invention relates to a part of the component situated nearer to the flexion-extension axis of rotation of the articulating anatomical joint or respectively the rotating joint according to the present invention.

Referring now to FIGS. 3-11, which are provided by way of example and not limitation, the present invention is directed towards an external load bearing device for distraction of an articulating anatomical joint with the function of eliminating weight and mechanical stress of the physiological load in a damaged anatomical joint for a limited period of time. Whereas the present invention is particularly suited to address issues associated with osteoarthritis (OA), focal cartilage defects and treatment of fractures occurred inside the knee joint, but also the present invention lends itself to broader applications.

An external load bearing distraction device 100 shown in FIGS. 3-11 is a device placed outside the skin on a medial or lateral side of the knee joint, preferably lateral side. The device 100 distracts the damaged articular surfaces of the medial compartment of the knee joint through a plurality of Schanz screws 123 fixedly connected to two longitudinal translational tubes 103, 106. The use of the device 100 is to provide unloading inside the medial compartment of the osteoarthritic knee. The device 100 must be under tension to achieve the distraction of the knee joint. During the period of 6 to 8 weeks while the device 100 is being applied, the patient will walk on crutches with weight bearing of the operated extremity up to 5 kg. Despite using crutches, the joint distraction by the device 100 places considerable strains on the device 100, as distraction and knee joint movement are taking place simultaneously.

Referring to FIGS. 3 to 11, the external load bearing distracting device 100 for an articulating anatomical joint comprising a first translational tube 106 configured to be attached to a first anatomical member of the articulating anatomical joint and a first rotatable threaded rod 107 operably associated with the first translational tube 106; a second translational tube 103 configured to be attached to a second member of the articulating anatomical joint, and a second rotatable threaded rod 108 operably associated with the second translational tube 103; and a rotating joint 117 joining the first and second rotatable threaded rods 107, 108 are shown. Said components 106, 107, 103 and 108 are disposed along a longitudinal axis 118 of the device 100. The first translational tube 106 is slidably arranged around the first rotatable threaded rod 107 and the second translational tube 103 is slidably arranged around the second rotatable threaded rod 108. The first rotatable threaded rod 107 at its proximal end comprises a ring-shaped member 107' fixedly secured to the first rotatable rod 107. The ring-shaped member 107' and the first rotatable threaded rod 107 are made as one solid part. The first and second rotatable threaded rods 107, 108 are configured to be disposed on opposite sides of a mediolateral axis 119 of rotation of the rotating joint 117. During application of the device 100, the mediolateral axis 119 of rotation of the rotating joint 117 is aligned with a flexion-extension axis of the articulating anatomical joint.

During flexion of the knee joint, the first and second translational tubes 106, 103 may be freely longitudinally displaced along the first and second rotatable threaded rods 107, 108. Therefore, the first and second rotatable threaded rods 107, 108 each has a length as to enable a longitudinal displacement of the first and second translational tubes 106, 103 away from the rotating joint 117, and any additional components arranged at distal end parts of the first or second rotatable threaded rods 107, 108 are positioned so as to enable said longitudinal displacement of the first and second translational tubes 106, 103 during flexion of the knee joint.

Each of said four components 106, 107, 108 and 103 is preferably carried out of one solid part. Preferably, the first translational tube 106, first rotatable threaded rod 107, second translational tube 103, second rotatable threaded rod 108 and rotating joint 117 are made of a biocompatible alloy selected from implant grade stainless steel, cobalt chrome, titanium or nitinol alloys. Preferably, said components 106, 107, 108, 103 and 117 are made of titanium alloys.

The first and second translational tubes 106, 103 have round cross section and are provided with a plurality of clamps 110 suitable for housing transcutaneous pins 123 or Schanz screws or similar known elements, to ensure the connection of the device 100 to the first and respectively to the second anatomical member of the articulating anatomical joint. The clamps 110 housing the transcutaneous transverse pins 123 secure the first translational tube 106 to the first anatomical member of the articulating anatomical joint (femur) and respectively the second translational tube 103 to the second anatomical member of the articulating anatomical joint (tibia) to medial or lateral sides of the anatomical articulating joint. Preferably, the clamps 110 are spaced apart as far as is practical in order to provide maximum rigidity in the connection between the first and second translational tubes 106, 103 and corresponding anatomical members of the articulating anatomical joint. For the clarity of FIGS. 3, 4 and 5, only some of the illustrated clamps 110 contain all reference signs of all components thereof, but it is obvious and evident that each clamp 110 consists of the same components. In order to allow the housing and then the fastening of transcutaneous transverse pins 123, Schanz screws or similar elements, each clamp 110 has an upper base 112 removably associated with a lower base 113 and at least one seat 111 therebetween to house at least one transcutaneous pin 123, Schanz screws or similar known elements. Each clamp 110 is fixedly connected to the first and second translational tubes 106, 103 by means of the upper base 112, lower base 113, bottom base 116 and upper and lower attachment screws 114, 114'. The lower base 113 of each clamp 110 has a first extension 113', where the lower base 113 and the first extension 113' thereof are carried out of one solid part. The lower base 113 and the first extension 113' thereof have inner substantially spherical portion that matches with an outer surface of the first and second translational tubes 106, 103 and is sized so to encircle upper and side portions of an outer surface of the first and second translational tubes 106, 103. The upper base 112 of each clamp 110 is removably fixed to the lower base 113 and respective first and second translational tube 106, 103 through an attachment screw 114. The bottom base 116 has a second extension 116', the bottom base 116 and the second extension 116' thereof are carried out of one solid part. The bottom base 116 and its second extension 116' are removably fixed to the respective first and second translational tubes 106, 103 through the attachment screw 114'. The bottom base 116 and the second extension 116' thereof have an inner substantially spherical portion that matches with the outer surface of the first and second translational tubes 106, 103 and is sized so to encircle a lower portion of the outer surface of the first and second translational tubes 106, 103. Further, side surfaces of the first extended part 113' and the second extended part 116' match to each other, so when the clamps 110 are fixedly connected through the attachment screws 114, 114' to the respective first and second translational tubes 106, 103, each clamp 110 is substantially shaped like cuboid.

The transcutaneous pins 123 are formed of metal and are of a type which is well known in the art. Preferably, the transcutaneous pins 123, Schanz screws or similar known elements are made of a biocompatible alloy selected from implant grade stainless steel, cobalt chrome, titanium or nitinol alloys. Preferably, the transcutaneous pins 123 are made of titanium alloys.

Figure 9:
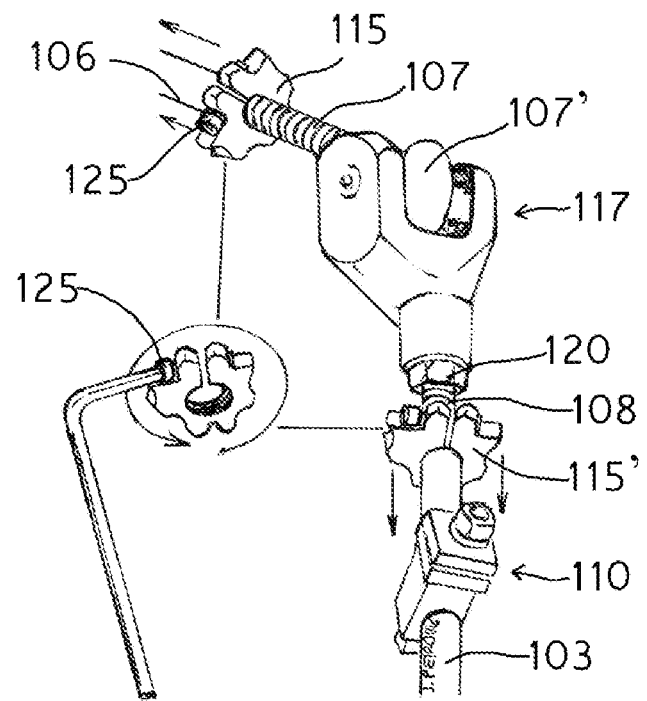
FIG. 9 is a perspective view of the rotating joint and adjustment clamping nuts showing principle of a longitudinal translation of a first and second translational tubes.

The first and second rotatable threaded rods 107, 108 are configured to be fixedly coupled to the rotating joint 117, whereby the rotating joint 117 enables rotation and flexing of the articulating anatomical joint. The first and second translational tubes 106, 103 are slidably arranged around the respective first and second rotatable extension 107, 108 and are capable of sliding along the longitudinal axis 118 of the device 100. The first and second rotatable threaded rods 107, 108 each comprises a first and second adjustment clamping nut 115, 115' in a releasable threaded connection for a distraction of the medial knee compartment by turning said adjustment clamping nuts 115, 115', as illustrated in FIG. 9. The first and second adjustment clamping nuts 115, 115' each comprises a socket head cap threaded screw 125 which is engaged with a threaded socket provided in the adjustment clamping nuts 115, 115', thereby securing the adjustment clamping nuts 115, 115' in position on the first and second rotatable threaded rods 107, 108. The socket head cap threaded screw 125 can typically be operated with a hexagonal key. The first adjustment clamping nut 115 is positioned between the rotating joint 117 and a proximal end of the first translational tube 106 and the second adjustment clamping nut 115' is located between the rotating joint 117 and a proximal end of the second translational tube 103. Further, between the rotating joint 117 and the second adjustment clamping nut 115' an anti-rotation nut 120 is located. The anti-rotation nut 120 functions as a key to "tie" the rotating joint 117 and second rotatable threaded rod 108 preventing either one from rotating while the device 100 is being applied. In the illustrated embodiment, while the device 100 is being applied, to secure an unwanted excess rotation of the second translational tube 103, a distal end part of the second translational tube 103 comprises a pair of parallelly arranged first pins 121 extending in a longitudinal direction along the longitudinal axis 118 of the device 100. A proximal part of each first pin 121 is being fixed to the distal end part of the second translational tube 103 and a distal part of each first pin 121 is extending beyond the distal end part of the second translational tube 103. A distal end part of the second rotatable threaded rod 108 comprises an aperture for the acceptance of a second pin 122 therethrough, the second pin 122 is extending radially outside an outer surface of the second rotatable threaded rod 108. The pair of parallelly arranged first pins 121 are placed perpendicular to the second pin 122, wherein the pair of parallelly arranged first pins 121 and the second pin 122 contact each other to limit rotation of the second translational tube 103 relative to the second rotatable rod 108. The pair of parallelly arranged first pins 121 and the second pin 122 are being mutually positioned to limit rotation of the second translational tube 103 in relation to the second rotatable rod 108 around a longitudinal axis 118 of a device 100 in each direction for approximately 20°, i.e., total for approximately 40°.

According to another embodiment, to secure the unwanted excess rotation of the first translational tube 106, the pair of parallelly arranged first pins 121 and the second pin 122 may be arranged on the first translational tube 106 and first rotatable threaded rod 107 in a same manner as arranged in the second translational tube 103 and the second rotatable threaded rod 108. In another embodiment, the pair of parallelly arranged first pins 121 and the second pin 122 may be arranged both on the first and second translational tubes 106, 103 and first and second rotatable threaded rods 107, 108.

In both embodiments, the parallelly arranged first pins 121 and the second pin 122 are being mutually positioned to limit rotation of the respective first or second translational tube 106, 103 in relation to the respective first or second rotatable threaded rod 107, 108 around a longitudinal axis 118 of a device 100 in each direction for approximately 20°, i.e., total for approximately 40°.

The second pin 122 arranged at distal end parts of the first or second rotatable threaded rods 107, 108, or both, is positioned so as to enable the longitudinal displacement of the first and second translational tubes 106, 103 during flexion of the knee joint.

Figure 7:
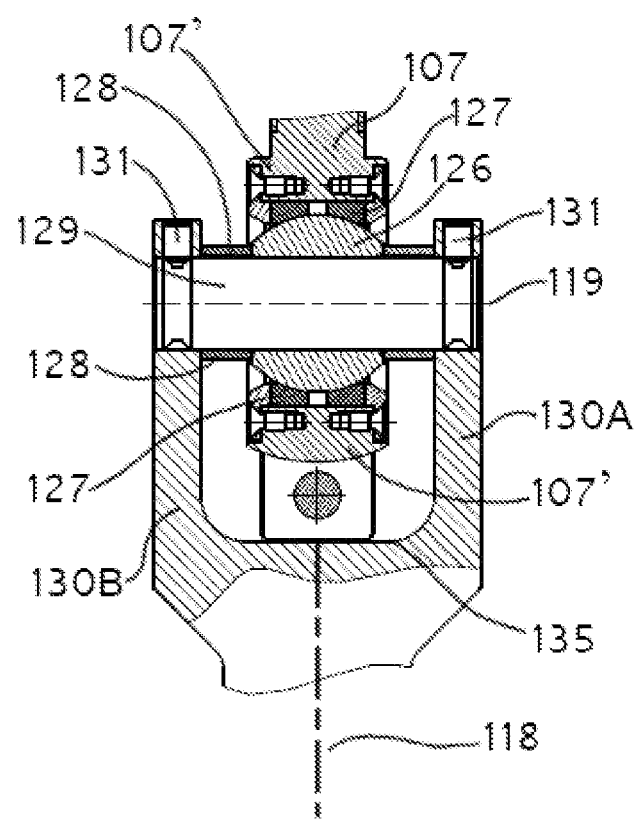
FIG. 7 is a cross section view of a rotating joint of FIGS. 5 and 6.

The external load bearing distracting device 100 for the articulating anatomical joint include the first and second rotatable rods 107, 108 joined by the rotating joint 117. Proximal ends of the two rotatable threaded rods 107, 108 connect to the rotating joint 117 by threading or welding into the rotating joint 117 from opposite ends. Referring to FIGS. 5 to 7, a structure of the rotating joint 117 will be described in more detail. The rotating joint 117 comprises a clevis connector 130A, 130B provided with a threaded hole for receiving the second rotatable threaded rod 108, a ball element 126 and an internal ring 127 encircling the ball element 126, a ring-shaped member 107' encircling the internal ring 127. The ring-shaped member 107' is fixedly secured to a proximal end of the first rotatable threaded rod 107. The ball element 126, ring-shaped member 107' and internal ring 127 rotatably engage each other around a mediolateral axis 119 of rotation of the rotating joint 117. The ring member 107' is fixedly secured to the proximal end of the first rotatable threaded rod 107 by press-fitting, welding, threading, a locking pin or adhesively attaching. The ring member 107' is fully encircling the ball element 126 and the internal ring 127. The ring member 107' is configured to form a spherical volume within which the ball element 126 and an internal ring 127 are arranged as shown in the cross-sectional view of FIG. 7. The internal ring 127 is fully encircling the ball element 126, and the ring-shaped member 107' is fully encircling the internal ring 127. The internal ring 127 is preferably made from ultra-high-molecular-weight polyethylene. The ball element 126, ring-shaped member 107' and internal ring 127 rotatably engage each other around the mediolateral axis 119 of rotation of the rotating joint 117, the mediolateral axis 119 of rotation of the rotating joint 117 is aligned with the flexion-extension axis of rotation of the articulating anatomical joint. The rotating joint 117 comprises the clevis connector 130A, 130B. The clevis connector 130A, 130B is pivotally connected by a clevis pin 129 and allows the clevis connector 130A, 130B to pivot about the mediolateral axis 119. Therefore, the 119-axis clevis pin 129 is a single piece pin extending through the ball element 126. The clevis pin 129 is fixedly secured to the clevis connector 130A, 130B by an appropriate pair of screws 131. To provide alignment of the first and second rotatable threaded rods 107, 108 and the ball element 126 with the longitudinal axis 118 of the device 100, a spacing ring 128 is arranged around the clevis pin 129 and between the clevis connector 130A, 130B and the ball element 126. The clevis connector 130A, 130B is provided with a threaded hole for receiving the second rotatable threaded rod 108. Between the clevis connector 130A, 130B of the rotating joint 117 and the second adjustment clamping nut 115' the anti-rotation nut 120 is located.

Figure 10:
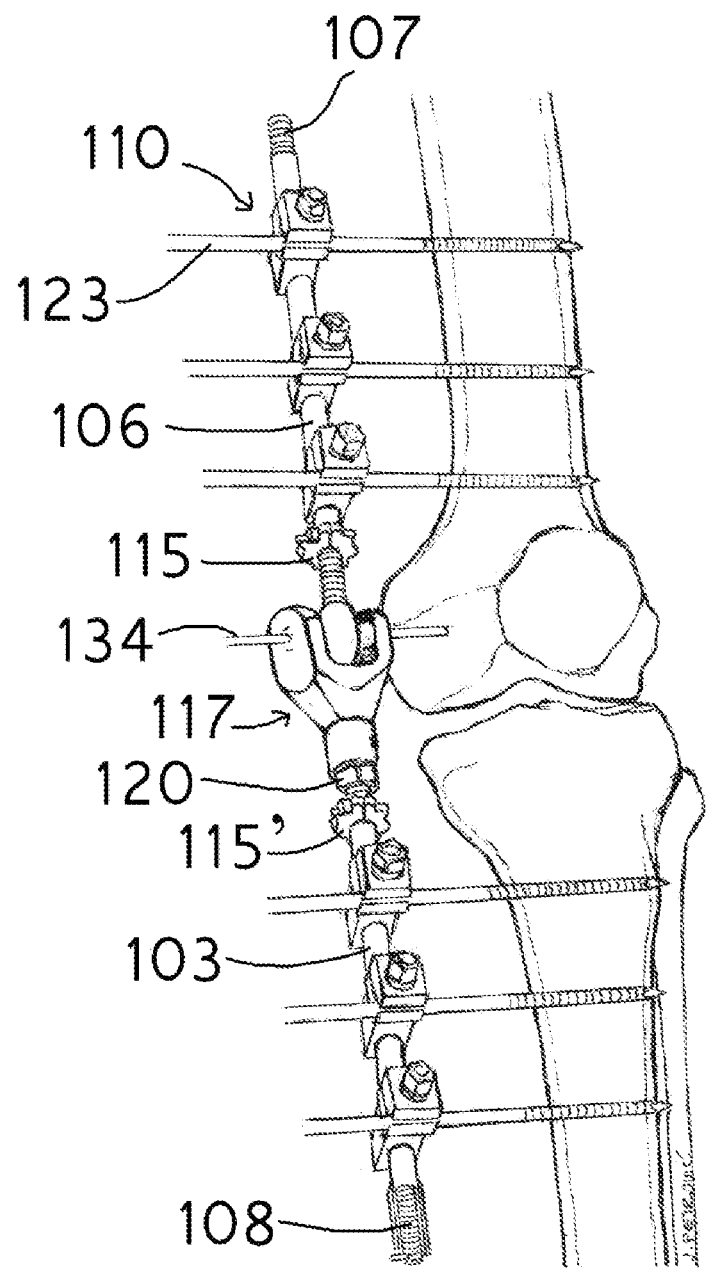
FIG. 10 is a perspective view showing the distracting device anchored to a knee joint with a knee joint in full extension.

Throughout the clevis connector 130A, 130B, ball element 126 and the clevis pin 129 extends a bore in the direction of the mediolateral axis 119 of rotation of the rotating joint 117, the bore is arranged in a center of rotation of the rotating joint 117. Said bore enables the positioning the mediolateral axis 119 of the rotating joint 117, by the virtue of a first Kirschner wire 134, to be aligned with the flexion-extension axis of the articulating anatomical joint as illustrated in FIG. 10. Said bore is dimensioned to allow first Kirschner wire 134 to pass therethrough.

During the first period of 2 to 4 weeks of implantation of the device 100, it may be preferable to keep the knee joint in an extension position, namely to prevent natural range of motion of the knee joint. Therefore, additional elements functioning as a brake pad may be removably connected within the rotating joint 117. As illustrated in FIGS. 3, 4, 5 and 8, two mutually complementary brake elements 132A, 132B may be inserted between the ring-shaped member 107' of the first rotatable threaded rod 107 and an inner surface 135 of the clevis connector 130A, 130B. Generally, the clevis connector 130A, 130B has a U-shaped cross-section such as a U-shaped yoke. The inner surface 135 of the clevis connector 130A, 130B is a surface located parallel to the mediolateral axis 119 and orthogonal to the longitudinal axis 118 of the device 100. The inner surface 135 of the clevis connector 130A, 130B and an outer surface of the ring-shaped member 107' define a gap 136 (illustrated in FIGS. 3 and 4) configured for accommodating a two mutually complementary brake elements 132A, 132B, the inner surface 135 of the clevis connector 130A, 130B is a surface located parallel to the mediolateral axis 119. As illustrated in FIG. 5, each of the two brake elements 132A, 132B in a cross-section has a L-shaped outer surfaces. Two brake elements 132A, 132B each includes a spherical internal surface that is sized and configured to be aligned with an outer surface of the ring 107' of the first rotatable threaded rod 107. The two brake elements 132A, 132B each has an internally threaded bore, wherein a locking screw 133 may be threaded into said internally threaded bore. Mutually tightening the two brake elements 132A, 132B by means of the locking screw 133 against the outer surface of the ring 107' generates sufficient frictional interference between the outer surface of the ring 107' and the spherical internal surface of the mutually coupled brake elements 132A, 132B. This prevents any pivoting movement of the first and second rotatable threaded rods 107, 108 about the mediolateral axis 119 of the rotating joint 117 and accordingly around the flexion-extension axis of rotation of the articulating anatomical joint. After examining the knee joint cartilage and depending on the doctor's assessment, the two brake elements 132A, 132B may be removed and after the removal of said brake elements 132A, 132B, the device 100 enables natural movement of the knee joint for the rest of time said device 100 is applied.

Figure 8:
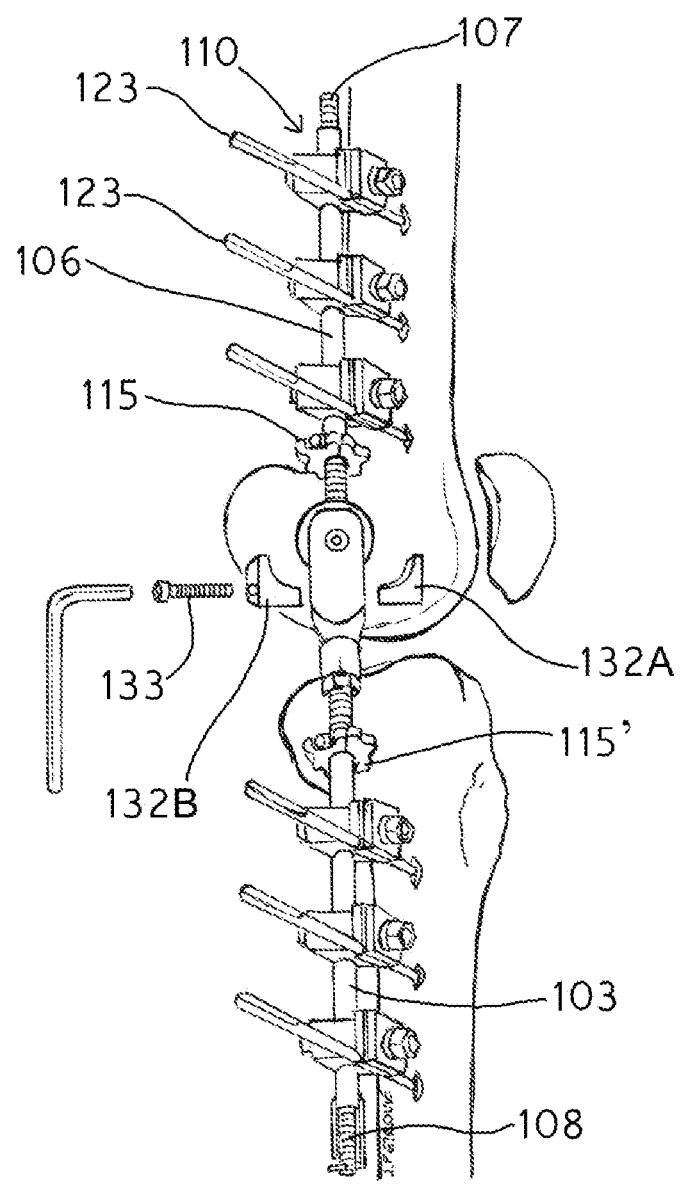
FIG. 8 is a perspective view showing the distracting device anchored to a knee joint and inserting of a two mutually complementary brake elements into the rotating joint.

FIG. 8 illustrates the distracting device 100 applied on a lateral side of a knee joint, FIG. 9 illustrates a perspective view of the rotating joint 117 and adjustment clamping nuts 115, 115' showing principle of longitudinal translation of the first and second translational tubes 106, 103 and accordingly a distraction of the medial knee compartment. The mediolateral axis 119 of rotation of the rotating joint 117 is aligned with the flexion-extension axis of rotation of the articulating anatomical joint. The three transcutaneous pins 123 already inserted in each bone are inserted through seats 111 of the clamps 110 that are already placed to the first and second translational tubes 106, 103 of the distracting device 100. The clamps 110 are still not fixedly tightened, therefore they are loosely positioned about 30 mm from the skin. The transcutaneous pins 123 have been already placed in femur and tibia. The clamps 110 are now tightened and locked manually to both first and second translational tubes 106, 103 of the distracting device 100 fixing the transcutaneous pins 123 to the distracting device 100. The distraction of the medial knee compartment begins by turning the adjustment clamping nut 115 at the femoral and another adjustment clamping nut 115' at the tibial site simultaneously, by one and a half turn each so that each adjustment clamping nut 115, 115' contacts/abuts the respective proximal end of the first and second translational tubes 106, 103 being proximal to the rotating joint 117. By simultaneously turning respective adjustment clamping nuts 115, 115', the first and second translational tubes 106, 103 are shifted along the longitudinal axis 118 in opposite direction away from the mediolateral axis 119. By shifting the first and second translational tubes 106, 103 away from the mediolateral axis 119 of the rotating joint 117, femur and tibia are mutually distracted to distance corresponding at least to a healthy knee joint. During application of the distracting device 100 to the patient and unloading the medial knee compartment by positioning the respective adjustment clamping nuts 115, 115' on the first and second rotatable threaded rods 107, 108, during the patient's natural knee joint motion as the first and second translational tubes 106, 103 slide around the respective first and second rotatable threaded rods 107, 108, each adjustment clamping nut 115, 115' contacts the end parts of the first and second translational tubes 106, 103 and limits translational movement of the first and second translational tubes 106, 103 towards the mediolateral axis 119 of rotation of the rotating joint 117.

Figure 11:
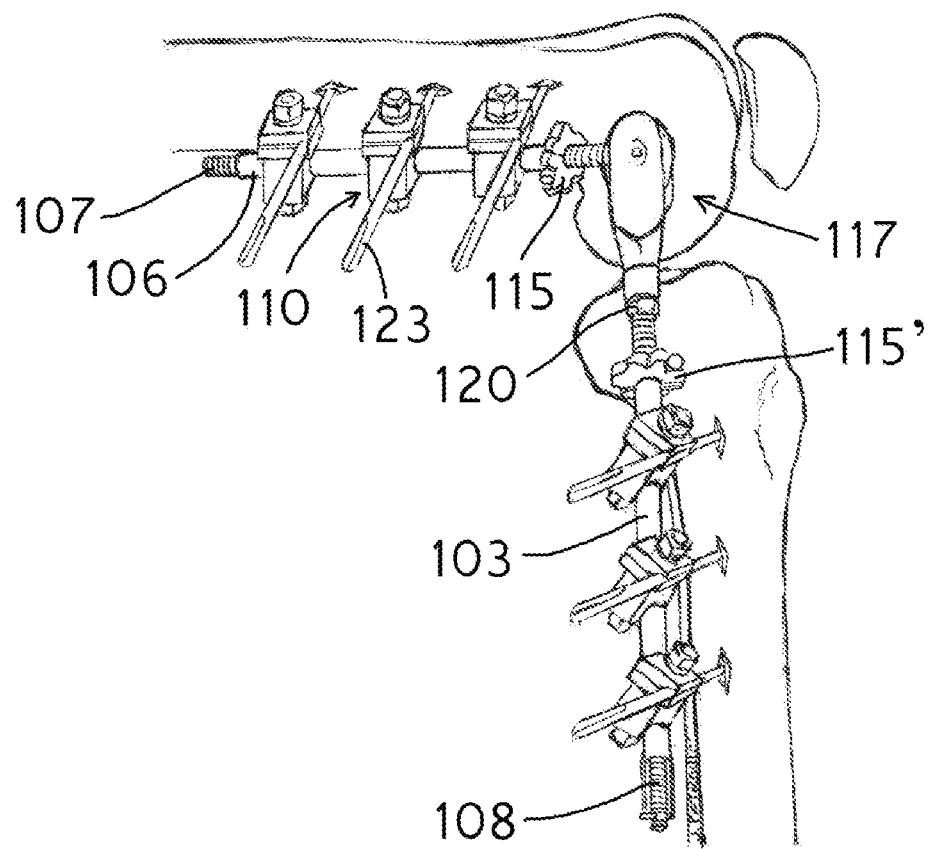
FIG. 11 is a perspective view showing the distracting device anchored to the knee joint during the flexion of the knee joint.

Each turn of the first and second clamping nut 115, 115' represents 1 mm of distraction, therefore the medial compartment of the knee should be now distracted during the surgical procedure approximately for 3 mm. The arthroscope is introduced into the knee to confirm that the tibial and femoral joint surfaces are distracted and the first and second clamping nuts 115, 115' are locked with the socket head cap screw 125 by the hexagonal key. This process should be done with the knee in full extension. As well, the surgeon should perform 0-90 degrees of flexion with the arthroscope inside the knee to make sure that medial articular surface of the tibia and of the femur are not in contact, as illustrated in FIG. 11. Another reason why it is very important to perform 0-90 degrees knee movement is to make sure that the soft tissues around transcutaneous pins 123 have been adapted to the 0-90° range of motion. The distracting device 100 is anchored in a position where the mediolateral axis 119 of the rotating joint 117 corresponds to the flexion-extension axis of rotation of the articulating anatomical joint, the flexion-extension axis is determined to enable flexion-extension of the articulating anatomical joint for at least 90°.

Figure 12:
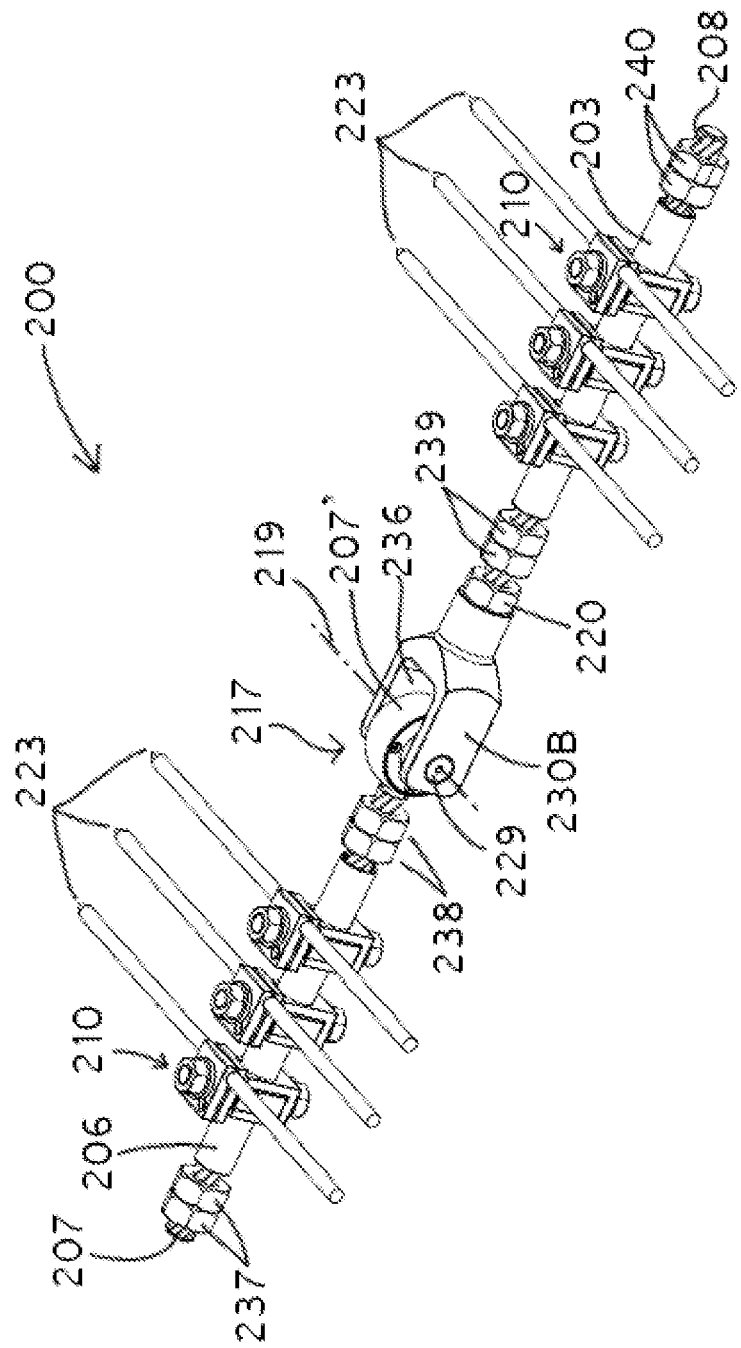
FIG. 12 is a perspective view of a distracting device according to a second embodiment of the present invention.

In a second embodiment of the present invention, shown in FIG. 12, instead of the first and second adjustment clamping nuts 115, 115', a first pair of adjustment nuts 238 is provided on a first rotatable threaded rod 207 and a second pair of adjustment nuts 239 is provided on a second rotatable threaded rod 208. An external load bearing distracting device 200 for an articulating anatomical joint comprises a first translational tube 206 configured to be attached to a first anatomical member of the articulating anatomical joint; a first rotatable threaded rod 207; a second translational tube 203 configured to be attached to a second member of the articulating anatomical joint; a second rotatable threaded rod 208; a rotating joint 217 joining the first and second rotatable threaded rods 207, 208; the rotating joint 217 being configured to enable natural motion present in the articulating anatomical joint; a first pair of adjustment nuts 238 provided on the first rotatable threaded rod 207; and a second pair of adjustment nuts 239 provided on the second rotatable threaded rod 208.

The first translational tube 206 is slidably arranged around the first rotatable threaded rod 207, and the second translational tube 203 is slidably arranged around the second rotatable threaded rod 208; the first and second rotatable threaded rods 207, 208 are configured to be disposed on opposite sides of the mediolateral axis 219 of rotation of the rotating joint 217. The first and second translational tubes 206, 203 have round cross section and are provided with a plurality of clamps 210 suitable for housing transcutaneous pins 223 or Schanz screws or similar known elements, to ensure the connection of the device 200 to the first and respectively to the second anatomical member of the articulating anatomical joint. The clamps 210 are of the same design as the clamps 110 as above described for the first embodiment of the invention.

The first pair of adjustment nuts 238 is positioned between the rotating joint 217 and a proximal end of the first translational tube 206 such that a longitudinal displacement of the first translational tube 206, towards the joint 217, relative to the first rotatable threaded rod 207 is limited by a contact between the first pair of adjustment nuts 238 and the first translational tube 206; and a longitudinal displacement of the second translational tube 203, towards the rotating joint 217, relative to the second rotatable threaded rod 208 is limited by a contact between the second pair of adjustment nuts 239 and a proximal end of the second translational tube 203.

As illustrated in FIG. 12, distal ends of the respective first and second threaded rods 207, 208 comprises a respective third and fourth pair of nuts 237, 240. Said third and fourth pair of nuts 237, 240 may limit the longitudinal displacement of the first and second translational tubes 206, 203. In a preferred second embodiment of the present invention, the third and fourth pair of nuts 237, 240 are not included. The second embodiment of the present invention also provides means to secure an unwanted excess rotation of the respective first or second translational tube 206, 203 in relation to the respective first or second rotatable rod 207, 208, or both. Therefore, instead of said pairs of nuts 237, 240; the second translational tube 203 comprises a pair of parallelly arranged first pins 121 and the second rotatable threaded rod 208 comprises a second pin 122, said pins are in such engagement to prevent excess rotation of the second translational tube 203 relative to the second rotatable threaded rod 208, said pins are positioned in a manner as already described for the first embodiment of the present invention. To secure an unwanted excess rotation of the first translational tube 206 relative to the first rotatable threaded rod 207, the pair of parallelly arranged first pins 121 and the second pin 122 may be arranged on the first translational tube 206 and first rotatable threaded rod 207 in a same manner as arranged in the second translational tube 203 and the second rotatable threaded rod 208. In another embodiment, the pair of parallelly arranged first pins 121 and the second pin 122 may be both arranged on the first and second translational tubes 206, 203 and first and second rotatable threaded rods 207, 208.

In both embodiments, the parallelly arranged first pins 121 and the second pin 122 are being mutually positioned to limit rotation of the respective first or second translational tube 206, 203 in relation to the respective first or second rotatable rod 207, 208 around a longitudinal axis 118 of a device 200 in each direction for approximately 20°, i.e., total for approximately 40°.

Proximal ends of the two rotatable threaded rods 207, 208 connect to the rotating joint 217 by threading or welding into the rotating joint 217 from opposite ends. A structure of the rotating joint 217 is the same as above described for the rotating joint 117 in the first embodiment of the invention. The rotating joint 217 comprises a clevis connector 230A, 230B provided with a threaded hole for receiving the second rotatable threaded rod 208, a ball element and an internal ring encircling the ball element, a ring-shaped member 207' encircling the internal ring. The clevis connector 230A, 230B is the same as above described for the clevis connectors 130A, 130B in the first embodiment of the invention The ring-shaped member 207' is fixedly secured to a proximal end of the first rotatable threaded rod 207. The ball element, ring-shaped member 207' and internal ring rotatably engage each other around a mediolateral axis 219 of rotation of the rotating joint 217. The ring member 207' is fixedly secured to the first rotatable threaded rod 207 by press-fitting, welding, threading, a locking pin or adhesively attaching. The ball element, ring-shaped member 207' and internal ring rotatably engage each other around the mediolateral axis 219 of rotation of the rotating joint 217, the mediolateral axis 219 of rotation of the rotating joint 217 is aligned with the flexion-extension axis of rotation of the articulating anatomical joint. The clevis connector 230A, 230B is pivotally connected by a clevis pin 229 and allows the clevis connector 230A, 230B to pivot about the mediolateral axis 219. The clevis pin 229 is fixedly secured to the clevis connector 230A, 230B by an appropriate pair of screws. The clevis connector 230A, 230B is provided with a threaded hole for receiving the second rotatable threaded rod 208. Between the clevis connector 230A, 230B of the rotating joint 217 and the second pair of adjustment nuts 239 the anti-rotation nut 220 is located.

The second embodiment of the present invention also provides possibility to temporally keep the knee joint in an extension position, namely to prevent the natural range of motion of the knee joint. Therefore, additional elements functioning as a brake pad may be removably connected within the rotating joint 217. Two mutually complementary brake elements may be inserted between the ring-shaped member 207' of the first rotatable threaded rod 207 and an inner surface of the clevis connector 230A, 230B. As already described above, the clevis connector 230A, 230B has a U-shaped cross-section such as a U-shaped yoke. The inner surface of the clevis connector 230A, 230B is a surface located parallel to the mediolateral axis 219 and orthogonal to a longitudinal axis of the device 200. The inner surface of the clevis connector 230A, 230B and an outer surface of the ring-shaped member 207' define a gap 236 configured for accommodating a two mutually complementary brake elements, the inner surface of the clevis connector 230A, 230B is a surface located parallel to the mediolateral axis 219. As illustrated and described for the first embodiment of the invention, each of the two brake elements in a cross-section has an L-shaped outer surfaces. The two brake elements each includes a spherical internal surface that is sized and configured to be aligned with an outer surface of the ring 207' of the first rotatable threaded rod 207. The two brake elements each has an internally threaded bore, wherein a locking screw may be threaded into said internally threaded bore. Mutually tightening the two brake elements by means of the locking screw against the outer surface of the ring 207' generates sufficient frictional interference between the outer surface of the ring 207' and the spherical internal surface of the mutually coupled brake elements. This prevents any pivoting movement of the first and second rotatable threaded rods 207, 208 about the mediolateral axis 219 of the rotating joint 217 and accordingly around the flexion-extension axis of rotation of the articulating anatomical joint.

Components of the distracting device 100, 200 are made from a biocompatible alloy selected from implant grade stainless steel, cobalt chrome, titanium or nitinol alloys, or ceramic, or combinations thereof. Preferably, the components of the distracting device 100 are made of titanium alloys. Components of the distracting device 100, 200 may be formed from a high strength polymer material such as RCH 1000 high molecular weight polyethylene or Hi-Fax 1900 ultra-high molecular weight polyethylenes to minimize friction and wear. Combinations of materials can also be used to maximize the properties of materials for different components of the present invention.

The present invention is also directed towards a method of implanting an external load bearing distracting device 100 for an articulating anatomical joint, preferably the articulating anatomical joint is a knee joint. Implanting of the distracting device 100 is performed with the articulating anatomical joint in a full extension. A standard knee arthroscopy will be performed by a surgeon's discretion, particularly where there are symptoms of damage to the meniscus. The knee arthroscopy is performed with two, or more, if necessary, standard portals. All mechanical debris is removed, including meniscal flaps, loose bodies and detached pieces of cartilage. A shaver or any similar aggressive instrument should not be used on or come in contact with the deteriorated cartilage. After the arthroscopic procedure, the portals are not sutured, because after placement of the distracting device and a medial compartment distraction, further arthroscopy will be performed to check the knee to confirm that the transverse pins or screws are not visible inside the knee joint, and that the distraction of a medial compartment joint surfaces is visible.

The method of implanting the external load bearing distracting device 100 for an articulating anatomical joint comprising the steps of: determining a center of rotation of a flexion-extension axis of the articulating anatomical joint and positioning a first Kirschner wire 134 in a bone of a first anatomical member of the articulating anatomical joint in the center of rotation of the flexion-extension axis of the articulating anatomical joint; positioning the distracting device 100, along a medial side of the articulating anatomical joint, by the virtue of the first Kirschner wire 134 and a bore arranged in a center of rotation of a rotating joint 117 of the distracting device 100; said bore enables the positioning the mediolateral axis of rotation of the rotating joint 117 to be aligned with the flexion-extension axis of the articulating anatomical joint; inserting of a plurality of transverse pins or screws 123 into a bone of the first and respectively into a second anatomical member of the articulating anatomical joint; fixing the transverse pins or screws 123 by tightening and locking a plurality of clamps 110 to a first translational tube 106 and respectively to a second translational tube 103 of the distraction device 100; and distracting of surfaces of a medial compartment of the articulating anatomical joint by simultaneously turning a first and respectively second adjustment clamping nut 115, 115' thereby providing a longitudinal displacement of the first translational tube 106 and respectively of the second translational tube 103 at a desired longitudinal position in relation to a flexion-extension axis of rotation of the articulating anatomical joint, and securing the adjustment clamping nuts 115, 115' in position on a first and second rotatable threaded rods 107, 108.

The flexing knee generates a migrating medial-lateral axis of rotation (shown as three small circles). This migration is described as "the evolute." The migrating axis of rotation has biomechanical and clinical implications. The numbered references show the areas and the femoral condyle and the tibial plateau where contact is made successively as the knee is flexed or extended. During the first 30 deg of knee flexion, the condylar surfaces of the femur roll posteriorly on the tibia. The greatest migration of the instantaneous center of rotation takes place during the first 0-15° or 0-30° of flexion. During the latter portion of the 30° of knee flexion, a progressive sliding begins. Once the center of rotation reaches the first 30° of knee flexion, it remains relatively fixed during the remainder of the flexion range. These two points are considered to be the optimum location for a single-axis distracting device 100, especially if the knee is not permitted to extend fully. According to one embodiment of present invention, one of centers of rotation of the flexion-extension axis of the articulating anatomical joint is located in a point during the first 0-15° of knee flexion. According to another embodiment of present invention, one of centers of rotation of the flexion-extension axis of the articulating anatomical joint is located in a point during the first 0-30° of knee flexion.

To determine the center of rotation of the flexion-extension axis of the articulating anatomical joint and positioning the first Kirschner wire 134 in the bone of the first anatomical member of the articulating anatomical joint in the center of rotation of the flexion-extension axis of the articulating anatomical joint is performed by means of a standard aiming device. Medial and lateral epicondyles of the femur are identified by palpation, and two small 2 cm incisions are performed over each epicondyle. The bony landmarks, namely medial and lateral epicondyles are now exposed. The standard aiming device is positioned on the medial and lateral epicondyle, from medially to laterally, and a second Kirschner wire is placed through the medial epicondyle, aiming the lateral epicondyle. The aiming device is removed and repositioned again, 5 mm anterior and 5 mm proximal to the second Kirschner wire. The first Kirschner wire 134 is now placed parallel to the second Kirschner wire, and the second Kirschner wire is now removed.

The rotating joint 117 and the distracting device 100 have the center of rotation positioned in the bore of the rotating joint 117. Said bore enables the positioning a mediolateral axis 119 of the rotating joint 117, by the virtue of the first Kirschner wire 134, to be aligned with the flexion-extension axis of the articulating anatomical joint as illustrated in FIG. 10. Said bore is dimensioned to allow the first Kirschner wire 134 to pass therethrough.

The distracting device 100 is placed, along a medial side of the articulating anatomical joint, so that the first Kirschner wire 134 passes through the of the rotating joint 117 of the distracting device 100 and the distracting device is positioned approximately 3 cm medial from the skin of the knee joint.

The plurality of transverse pins or screws 123 are inserted into the bone of the first and respectively into the second anatomical member of the articulating anatomical joint. In general, three screws should be placed medially in the femur, perpendicular to the femoral shaft, with the most distal screw approximately 1 cm proximal to the medial epicondyle of the knee. Another three transverse pins or screws 123 should be placed medially in the tibia, with the most proximal screw approximately at the line of tibial tuberosity. The transverse pins or screws 123 should be positioned for maximum mechanical stability in each bone, with bicortical purchase by the screw threads and with each screw at least 2 cm apart. The plurality of transverse pins or screws 123 are inserted into respective bones by using a standard surgical technique without damaging important structures (vessels, nerves, muscles and tendons).

After the transverse pins or screws 123 are inserted into the corresponding bones, the plurality of clamps 110 are still not fixed therefore they are loose positioned about 30 mm from the skin. The transverse pins or screws 123 are fixed by tightening and locking the plurality of clamps 110 to the first translational tube 106 and respectively to the second translational tube 103 of the distraction device 100.

Distracting of surfaces of the medial compartment of the articulating anatomical joint is performed by simultaneously turning the first and respectively second adjustment clamping nut 115, 115' thereby providing the longitudinal displacement of the first translational tube 106 and respectively of the second translational tube 103 at the desired longitudinal position in relation to the flexion-extension axis of rotation of the articulating anatomical joint. The distraction of the medial knee compartment begins by turning the first adjustment clamping nut 115 at the femoral and the second adjustment clamping nut 115' at the tibial site simultaneously, by one and a half turn each. Each turn of the clamping nut represents 1 mm od distraction, therefore the medial compartment of the knee should be now distracted during the surgical procedure approximately for 3 mm. This process should be done with the knee in the full extension.

The method further comprising performing of an arthroscopy to determine a desired distraction of the articulating anatomical joint. The arthroscope is now again introduced into the knee joint to confirm that the tibial and femoral joint surfaces are distracted and that the transverse pins or screws 123 are not visible inside the knee joint. The adjustment clamping nuts 115, 115' are now secured in position on the first and second rotatable threaded rods 107, 108, the first Kirschner wire 134 is now removed and performing 0-90° of flexion with the arthroscope inside the articulating anatomical joint to determine that surfaces of the medial compartment of the articulating anatomical joint are not in contact. Another reason why it is very important to perform 0-90 degrees knee movement is to make sure that the soft tissues around the transverse pins or screws 123 have adapted to the 0-90° range of motion.

After implantation of the distracting device 100, and the knee is left in extension, additional part of the distracting device 100, namely two mutually complementary break elements 132A, 132B may be inserted within the rotating joint 117 between a ring-shaped member 107' of the first rotatable threaded rod 107 and an inner surface 135 of the clevis connector 130A, 130B as illustrated in FIG. 8. The purpose of the break elements 132A, 132B is to prevent any unplanned movement of the knee, except the movement planned by the protocol. Removably connected break elements 132A, 132B within the rotating joint 117 of the distracting device 100 are temporarily preventing natural range of motion of the articulating anatomical joint, preferably during the first period of 2 to 4 weeks of implantation of the distracting device 100.

The external load-bearing distracting device 100 is temporarily attached to the patient, preferably for a period of 6 to 8 weeks.

The method of the present invention further comprises applying treatment of the articulating anatomical joint with hyaluronic acid, stem cells treatment for cartilage tissue regeneration, injecting signaling molecules or any other local or systemic treatment of the articulating anatomical joint, and combinations thereof.

The present invention is also directed towards a method of distracting an articulating anatomical joint, performed with the articulating anatomical joint in a full extension, comprising the steps of: anchoring a distraction device to a medial or lateral t a lateral or at a medial side of the articulating anatomical joint, or simultaneously on both sides of the articulating anatomical joint; distracting a of surfaces of a medial compartment of the articulating anatomical joint by simultaneously turning a first and respectively second adjustment clamping nut thereby providing a longitudinal displacement of the first translational tube and respectively of the second translational tube at a desired longitudinal position in relation to a flexion-extension axis of rotation of the articulating anatomical joint; and securing the adjustment clamping nuts in position on a first and second rotatable threaded rods of the distraction device.

The method further comprises determining a center of rotation of a flexion-extension axis of the articulating anatomical joint. According to one embodiment, one of centers of rotation of the flexion-extension axis of the articulating anatomical joint is located in a point during the first 0-15° of flexion. According to another embodiment, one of centers of rotation of the flexion-extension axis of the articulating anatomical joint is located in a point during the first 0-30° of flexion.

The method further comprises performing of an arthroscopy to determine a desired distraction of the articulating anatomical joint and performing 0-90° of flexion with the arthroscope inside the articulating anatomical joint to determine that surfaces of the medial compartment of the articulating anatomical joint are not in contact.

The method further comprises removably connecting a two mutually complementary brake elements within the rotating joint of the distracting device thereby temporarily preventing natural range of motion of the articulating anatomical joint. The two mutually complementary brake elements are temporarily connected within the rotating joint of the distracting device, preferably during the first period of 2 to 4 weeks of implantation of the distracting device.

According to the method, the external load-bearing distracting device is temporarily attached to the patient, preferably for a period of 6 to 8 weeks.

Obviously, numerous modifications and variations of the present invention are possible in light of the above teachings. It is therefore to be understood that within the scope of the appended claims, the invention may be practiced otherwise than as specifically described herein.

What is claimed is:

1. An external load bearing distracting device for an articulating anatomical joint comprising:
   a first translational tube configured to be attached to a first anatomical member of the articulating anatomical joint;
   a first rotatable threaded rod;
   a second translational tube configured to be attached to a second member of the articulating anatomical joint;
   a second rotatable threaded rod;
   a rotating joint joining the first and second rotatable threaded rods; the rotating joint configured to have a range of motion comparable to motion present in the articulating anatomical joint;
   a first adjustment clamping nut provided on the first rotatable threaded rod;
   a second adjustment clamping nut provided on the second rotatable threaded rod;
   wherein the first translational tube is slidably arranged around the first rotatable threaded rod, and the second translational tube is slidably arranged around the second rotatable threaded rod;

the first and second rotatable threaded rods are configured to be disposed on opposite sides of a mediolateral axis of rotation of the rotating joint, and wherein the first adjustment clamping nut is positioned between the rotating joint and a proximal end of the first translational tube such that a longitudinal displacement of the first translational tube, towards the rotating joint, relative to the first rotatable threaded rod is limited by a contact between the first adjustment clamping nut and the proximal end of the first translational tube; and the second adjustment clamping nut is positioned between the rotating joint and a proximal end of the second translational tube such that a longitudinal displacement of the second translational tube, towards the rotating joint, relative to the second rotatable threaded rod is limited by a contact between the second adjustment nut and the proximal end of the second translational tube.

2. The distracting device according to claim 1, wherein the first and second adjustment clamping nuts are in a releasable threaded connection with the first and second rotatable threaded rods for adjusting and fixing the first and second translational tubes at a desired longitudinal position in relation to a flexion-extension axis of rotation of the articulating anatomical joint and distraction of the articulating anatomical joint, wherein by turning said adjustment clamping nuts the first and second translational tubes are shifted along the first and second rotatable threaded rods in opposite directions away from the mediolateral axis of the rotating joint.

3. The distracting device according to claim 2, wherein each of the adjustment clamping nuts is configured to be fixedly secured to the first and second rotatable threaded rods by a threaded screw engaged to a threaded socket provided in the adjustment clamping nut.

4. The distracting device according to claim 1, wherein the rotating joint comprises a U-shaped clevis connector provided with a threaded hole for receiving the second rotatable threaded rod, the clevis connector having a clevis pin on which is mounted a ball element with an internal ring mounted thereon; and a ring-shaped member fixedly secured to a proximal end of the first rotatable threaded rod with the ring shaped member retaining the internal ring and ball element therein.

5. The distracting device according to claim 4, wherein an anti-rotation nut is located between the clevis connector of the rotating joint and the second adjustment clamping nut.

6. The distracting device according to claim 4, wherein an inner surface of the clevis connector and an outer surface of the ring-shaped member define a gap configured for accommodating two mutually complementary brake elements, and the inner surface of the clevis connector is a surface located parallel to the mediolateral axis of the rotating joint.

7. The distracting device according to claim 6, wherein each of the two brake elements has an L-shaped outer surface; and the two brake elements each include a spherical internal surface that is sized and configured to be aligned with an outer surface of the ring-shaped member of the first rotatable threaded rod; and a locking screw is threaded into an internally threaded bore in a brake element for tightening the two brake elements against the ring-shaped member thus preventing any pivoting movement of the first and second rotatable threaded rods about the mediolateral axis of the rotating joint.

8. The distracting device according to claim 1, wherein a pair of parallelly arranged spaced apart first pins extend downwardly from the second translational tube and a second pin extends outwardly from the second rotatable threaded rod between and perpendicularly to the first pins whereby, the pair of parallelly arranged first pins limiting rotation of the translational tube relative to the rotatable threaded rod.

9. The distracting device according to claim 8, wherein a distal end part of the second translational tube comprises the pair of parallelly arranged first pins extending in a longitudinal direction along the translational tube, a proximal part of each first pin being fixed to the distal end part of the translational tube and a distal part of each first pin extending beyond the distal end part of the translational tube.

10. The distracting device according to claim 8, wherein a distal end part of the second rotatable threaded rod comprises an aperture for the acceptance of the second pin therethrough, the second pin extending radially outside an outer surface of the second rotatable threaded rod.

11. The distracting device according to claim 8, wherein the pair of parallelly arranged first pins are perpendicular to the second pin; and the pair of parallelly arranged first pins and the second pin contact each other to limit rotation of the first or second translational tube relative to the second rotatable threaded rod around the longitudinal axis of the device.

12. The distracting device according to claim 1, wherein the rotating joint comprises a clevis pin, a ball element and an internal ring encircling the ball element, the ring-shaped member encircling the internal ring; the ball element, ring-shaped member and internal ring rotatably engage each other around the mediolateral axis; the clevis pin passes through the ball element and is pivotally connected to the clevis connector.

13. The distracting device according to claim 12, wherein throughout the clevis pin extends a bore arranged in a center of rotation of the rotating joint; said bore enables the positioning the mediolateral axis of rotation of the rotating joint to be aligned with a flexion-extension axis of the articulating anatomical joint.

14. The distracting device according to claim 1, wherein each of the first and second translational tubes are provided with one or more clamps each configured for fixedly connecting a transcutaneous pin, for attaching the first translational tube to the first anatomical member of the articulating anatomical joint and respectively for attaching the second translational tube to the second anatomical member of the articulating anatomical joint.

15. The distracting device according to claim 1, wherein components of the distracting device are made from a biocompatible alloy selected from implant grade stainless steel, cobalt chrome, titanium or nitinol alloys, or ceramic material, or combinations thereof.

16. An external load bearing distracting device for an articulating anatomical joint comprising:
- a first rotatable threaded rod;
- a second rotatable threaded rod;
- a rotating joint joining the first and second rotatable threaded rods;
- a first translational tube having one or more clamps mounted thereto, the clamps having transverse pins or screws extending therefrom, the first translational tube being axially slidably fitted onto the first rotatable threaded rod;
- a second translational tube having one or more clamps mounted thereto, the clamps having transverse pins or screws extending therefrom, the second translational tube being axially slidably fitted onto the second rotatable threaded rod;
- a first adjustment nut provided on the first rotatable threaded rod, the first adjustment nut having locking means for retaining the first adjustment nut in a fixed position on the first rotatable threaded rod;
a second adjustment nut provided on the second rotatable threaded rod, the second adjustment nut having locking means for retaining the second adjustment nut in a fixed position on the second rotatable threaded rod;
the first adjustment nut being positioned between the rotating joint and a proximal end of the first translational tube such that a longitudinal displacement of the first translational tube is limited by a contact between the first adjustment nut and the proximal end of the first translational tube;
the second adjustment nut being positioned between the rotating joint and a proximal end of the second translational tube such that a longitudinal displacement of the second translational tube is limited by a contact between the second adjustment nut and the proximal end of the second translational tube.

17. The distracting device according to claim 16, wherein the rotating joint is a U-shaped clevis connector provided with a threaded hole for receiving the second rotatable threaded rod and a ring-shaped member fixedly secured to a proximal end the first rotatable threaded rod.

18. A method of implanting an external load bearing distracting device for an articulating anatomical joint comprising the steps of:
providing the external load bearing distracting device having a rotating joint with a first rod extending upwardly therefrom and a first translational tube slidably mounted thereon and a second rod extending downwardly therefrom and a second translational tube slidably mounted thereon, the first rod having an axially movable first adjustment nut fitted thereto and the second rod having a second adjustment nut fitted thereto;
determining a center of rotation of a flexion-extension axis of the articulating anatomical joint and positioning a first Kirschner wire in a bone of a first anatomical member of the articulating anatomical joint in the center of rotation of the flexion-extension axis of the articulating anatomical joint;
positioning the distracting device, along a medial side of the articulating anatomical joint, using the first Kirschner wire and a bore provided at a center of rotation of a rotating joint of the distracting device to position a mediolateral axis of rotation of the rotating joint of the distracting device to be aligned with the flexion-extension axis of the articulating anatomical joint;
inserting pins or screws transversely into the bone of the first anatomical member and into a bone of a second anatomical member of the articulating anatomical joint;
fixing the pins or screws to the external load bearing distracting device by positioning and locking the pins or screws in a plurality of clamps on the first translational tube and the second translational tube of the distracting device;
positioning the first and second adjustment clamping nuts to provide a longitudinal displacement of the first translational tube and the second translational tube to desired longitudinal positions in relation to the center of rotation of the flexion-extension axis of the articulating anatomical joint; and
securing the first and second adjustment clamping nuts in position on the first and second rods of the distracting device.

19. The method according to claim 18, wherein the center of rotation of the flexion-extension axis of the articulating anatomical joint is located in a point during the first 0-15° of flexion.

20. The method according to claim 18, wherein the center of rotation of the flexion-extension axis of the articulating anatomical joint is located in a point during the first 0-30° of flexion.

21. The method according to claim 18, wherein the articulating anatomical joint is positioned in a full extension position during the steps of the method.

22. The method according to claim 18, wherein further comprising performing 0-90° of flexion with an arthroscope viewing an inside the articulating anatomical joint to determine that surfaces of the medial compartment of the articulating anatomical joint are not in contact.

23. The method according to claim 18, further comprising positioning a brake element within the rotating joint of the distracting device thereby limiting a range of motion of the articulating anatomical joint.

24. The method according to claim 23, wherein the brake element is temporarily positioned within the rotating joint of the distracting device for a period of 2 to 4 weeks following implantation of the distracting device.

25. The method according to claim 18, wherein the external load-bearing distracting device is fixed to the pins or screws for a period of 6 to 8 weeks.

26. The method according to claim 18, further comprising treating the articulating anatomical joint with hyaluronic acid, stem cells treatment for cartilage tissue regeneration, or injecting signaling molecules.

27. A method of distracting an articulating anatomical joint comprising the steps of:
anchoring a distracting device having a rotating joint with a first rod extending upwardly therefrom and a first translational tube slidably mounted thereon and a second rod extending downwardly therefrom and a second translational tube slidably mounted thereon, the first rod having an axially movable first adjustment nut fitted thereto and the second rod having a second adjustment nut fitted thereto, to bone at a medial or lateral side of the articulating anatomical joint, or simultaneously on both medial and lateral sides of the articulating anatomical joint;
distracting surfaces of a medial compartment of the articulating anatomical joint by turning the first and second adjustment nuts thereby providing a longitudinal displacement of the first translational tube and the second translational tube to a desired longitudinal position in relation to a flexion-extension axis of rotation of the articulating anatomical joint; and
securing the adjustment nuts in position on the first and second rods of the distracting device.

28. The method according to claim 27, further comprising positioning two mutually complementary brake elements within the rotating joint of the distracting device thereby limiting a range of motion of the articulating anatomical joint.

29. The method according to claim 28, wherein the two mutually complementary brake elements are positioned within the rotating joint of the distracting device for a period of 2 to 4 weeks following anchoring of the distracting device.

30. The method according to claim 27, wherein the distracting device is anchored for a period of 6 to 8 weeks.

* * * * *